(12) United States Patent
Ryan et al.

(10) Patent No.: US 8,809,738 B2
(45) Date of Patent: Aug. 19, 2014

(54) METHOD FOR PROVIDING REAL-TIME MONITORING OF CONTACT TIP PERFORMANCE

(75) Inventors: Robert D. Ryan, Belle River (CA); Tiejun Ma, Tecumseh (CA); David A. Bellamy, Tecumseh (CA)

(73) Assignee: Illinois Tool Works Inc., Glenview, IL (US)

( * ) Notice: Subject to any disclaimer, the term of this patent is extended or adjusted under 35 U.S.C. 154(b) by 55 days.

(21) Appl. No.: 13/419,506

(22) Filed: Mar. 14, 2012

(65) Prior Publication Data

US 2012/0234813 A1    Sep. 20, 2012

Related U.S. Application Data

(60) Provisional application No. 61/452,385, filed on Mar. 14, 2011.

(51) Int. Cl.
*B23K 33/00*    (2006.01)
*B23K 9/12*     (2006.01)
*B23K 9/095*    (2006.01)

(52) U.S. Cl.
CPC ............. *B23K 9/123* (2013.01); *B23K 9/095* (2013.01)
USPC .................................................... 219/137 R

(58) Field of Classification Search
USPC ......................................... 219/137 R, 137.1
See application file for complete search history.

(56) References Cited

U.S. PATENT DOCUMENTS

| 8,309,887 B2 * | 11/2012 | Yamamoto et al. ...... 219/137.61 |
| 2003/0029851 A1 * | 2/2003 | Suzuki et al. ............ 219/130.01 |
| 2008/0149608 A1 | 6/2008 | Albrecht |

FOREIGN PATENT DOCUMENTS

| EP | 1283088 | 2/2003 |
| WO | 0006335 | 2/2000 |

OTHER PUBLICATIONS

International Search Report; PCT/US2012/028982; dated Jun. 29, 2012.
Written Opinion of the International Searching Authority; PCT/US2012/028982; dated Jun. 29, 2012.

* cited by examiner

*Primary Examiner* — Dana Ross
*Assistant Examiner* — Renee L Miller
(74) *Attorney, Agent, or Firm* — Fildes & Outland, P.C.

(57) ABSTRACT

A method for tracking contact tip deterioration in real time in accordance with the present invention includes establishing a reference that relates welding parameters during welding production to contact tip life; monitoring welding parameters of a contact tip during use; comparing the monitored welding parameters to the reference; providing real-time feedback to an operator; and predicting contact tip failure from the comparison.

12 Claims, 6 Drawing Sheets

METHOD FOR PROVIDING REAL-TIME MONITORING OF CONTACT TIP PERFORMANCE

CROSS REFERENCE TO RELATED APPLICATION

This application claims the priority of U.S. Provisional Application No. 61/452,385 filed Mar. 14, 2011.

TECHNICAL FIELD

This invention relates to contact tips for a welding torch, and more particularly to a method of monitoring performance of a contact tip in non-constant voltage GMAW (gas metal arc welding) applications.

BACKGROUND OF THE INVENTION

It is known in the art relating to GMAW that the life span of a contact tip in a pulse application is significantly shorter than in a conventional application (i.e., constant voltage (CV)). The deterioration of the contact tip in pulse GMAW applications may be quantified by measuring a decrease in the average welding current, an increase in the standard deviation of the welding current, and/or an increase in the average welding voltage.

The deterioration of the contact tip in pulse GMAW applications may be caused by damage to the interface between the contact tip and the electrode wire caused by mechanical wear, high temperature of the welding arc, joule heat from the electric conductivity, and possible micro-arcing during pulse peaks. The electrical resistance of the interface between the contact tip and the electrode wire increases as the contact tip is deteriorated.

When a standard power source control mechanism is used, the increased resistance of the contact tip/electrode wire interface results in a decrease in the energy consumption at the welding arc. If the energy consumption falls below a certain threshold value, a smooth arc cannot be maintained, resulting in welding defects.

SUMMARY OF THE INVENTION

The present invention provides a method and system for monitoring welding contact tip condition and performance in real time in robotic or automatic manufacturing processes that use non-CV GMAW applications such as pulse, modified pulse, modified short circuit, or similar, in which the welding current is controlled to ramp between low (or background) and peak values at a rate having a magnitude of $10^6$ Amp/sec. The present invention thereby allows for the prediction of contact tip failure and for the efficient scheduling of welding cell maintenance activities.

A key indicator of the condition of the contact tip is the average welding current as a function of parts produced. The average welding current data may be monitored, calculated, and displayed in the form of a control chart, thereby allowing a user to track the condition of the contact tip. The user may also use the presently claimed system as a predictive maintenance tool by establishing control limits that allow the system to output a warning when the control (or tolerance) limits of a particular parameter are violated. Thus, the user may predict when a contact tip will fail and plan for changing the contact tip during scheduled production downtime rather than during a time when production would have to be interrupted.

More particularly, a method for tracking contact tip deterioration in real time in accordance with the present invention includes establishing a reference that relates welding parameters during welding production to contact tip life; monitoring welding parameters of a contact tip during use; comparing the monitored welding parameters to the reference; providing real-time feedback to an operator; and predicting contact tip failure from the comparison.

The method may further include providing a warning when contact tip energy consumption and welding parameters deviate unacceptably from the reference. The method also may include scheduling a contact tip change when contact tip energy consumption and welding parameters deviate unacceptably from the reference.

The step of monitoring welding parameters of a contact tip during use may include measuring one of welding current and welding voltage in real time. The step of comparing the monitored energy consumption and welding parameters to the reference may include displaying a control chart including average welding current plotted as a function of part count or productivity.

These and other features and advantages of the invention will be more fully understood from the following detailed description of the invention taken together with the accompanying drawings.

DETAILED DESCRIPTION OF THE INVENTION

Figure 1:
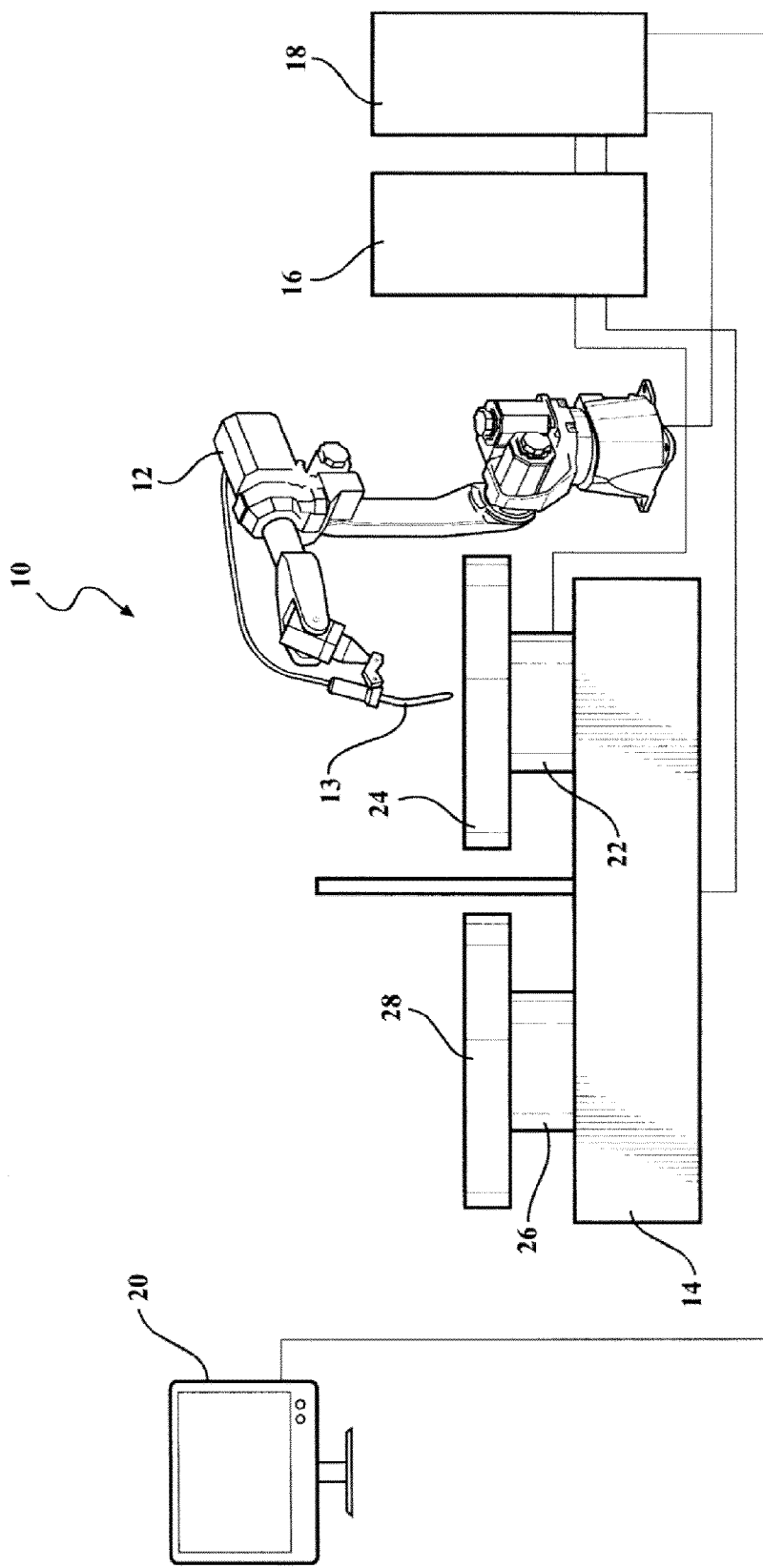
FIG. 1 a schematic view of a robotic welding manufacturing cell.

Referring now to the drawings in detail, numeral 10 in FIG. 1 generally indicates a robotic welding manufacturing cell. The welding cell 10 generally includes a welding robot 12 including a welding torch 13, a turn table 14 disposed in a working relationship relative to the robot, a power source 16 connected to the robot, a robot controller 18 connected to the power source, the robot, and the turn table, and a manufacture line display and control (MLDC) 20. The turn table 14 may have two sides including an A-side 22 that holds a workpiece such as part 24 and a B-side 26 that holds a workpiece such as part 28. While part 24 is being welded by the robot 12, part 28 may be loaded/unloaded by a handling robot or a human operator.

The welding power source 16 and the robot controller 18 may be separate or may be integrated in one welding control system unit. In either case, the power source 16 and controller 18 include logic devices that directly or indirectly provide proper welding energy output and control the welding locations and sequences. A welding operator may set welding parameters through the robot controller 18, and these parameters are then de-coded and executed by the system. The MLDC 20 monitors and controls the welding performed in the cell 10, which includes managing the welding programs of the robot, part movement, fixture engagement, and safety, and displaying information indicating the status of the cell. The MLDC 20 may also coordinate an entire manufacturing line having more than one welding cell. During production, the welding operator may monitor the MLDC 20 to obtain a status of the progress of the manufacturing process, and to troubleshoot and solve problems that halt production.

Most of the power sources currently used in automatic welding manufacturing lines are digital power sources having integrated data recording systems that allow for real-time acquisition of welding parameters including welding current, welding voltage, wire feeding speed, and the like. In the present invention, welding current and voltage are acquired and processed by the power source 16, or the robot controller 18, or an independent device such as the MLDC 20.

The welding torch 13 is equipped with a contact tip through which consumable electrode wire is fed while the robot 12 welds workpieces. The energy output of the power source 16 is delivered through the welding torch 13 (including the contact tip) to the consumable electrode wire, creating a welding arc and joining workpieces. The contact tip itself is a consumable item and must be replaced periodically to maintain acceptable welding quality. Typically, contact tips changes are scheduled in two different ways: scheduled changes and reactive changes. For most automotive applications, for example, contact tips are changed at a scheduled time across the whole line, for example, during a break time or at the end of a production shift. However, if a welding operator observes welding defects that are related to the contact tip deterioration, the welding cell or the line may be abruptly shut down to change the contact tip out-of-schedule, i.e., a reactive change.

This invention involves a software module, which can be either integrated in the robot controller or the MLDC system. With the execution of this software, the welding parameters (for example, the welding current) are collected in real-time through the welding power source or robotic controller. The frequency of data acquisition is 10 Hz or higher. One representative weld is picked among the welds that one robot conducts on one part. For example, a robot may make four welds on one part, which are three seconds, fifteen seconds, ten seconds, and forty seconds, respectively. The fifteen second weld can be picked as the representative weld. So, 150 data points for the welding current are collected for one weld (10 Hz×15 seconds).

The welding parameters at the arc start period and arc stop period are removed as noise. Typically, the arc start and arc stop are 0.5 and 0.4 seconds long. respectively. So, in this robot, the number of effective data on one weld (one part) will be:

$$(15-0.5-0.4)*10=141$$

The average and standard deviation of these data are calculated in real time and presented by the MLDC in various formats.

The present invention allows an end-user such as a welding operator to track contact tip condition (wear/deterioration) and performance in real time, to predict when a contact tip will fail, and to accordingly schedule maintenance activities such as contact tip changes in a proactive manner.

Figure 2:
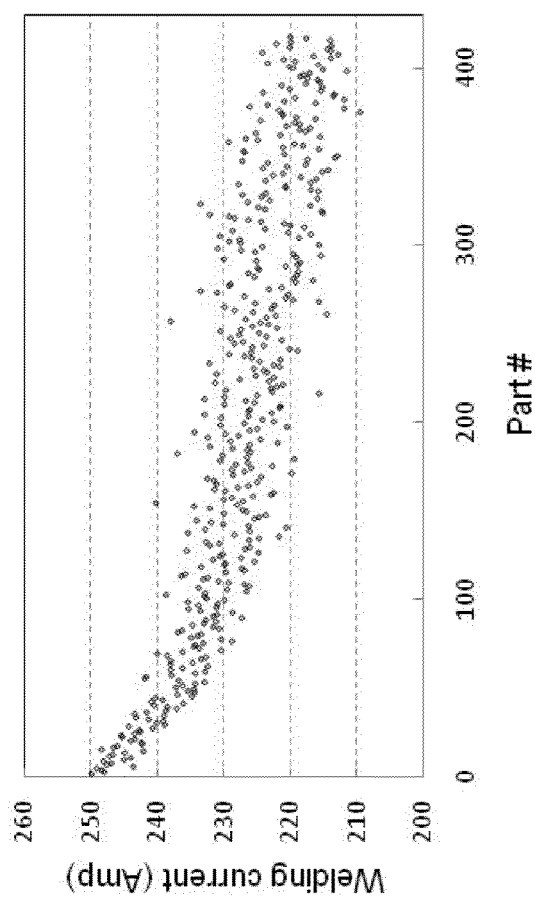
FIG. 2 is a graph of measured average welding current with respect to productivity (part count) for one contact tip in a mass production environment.

FIG. 2 graphically illustrates a typical set of average welding current values as a function of productivity (in terms of part count) for one contact tip through its lifespan in a mass production environment. Each data point in the graph represents the average welding current of a representative weld in one cycle (e.g., the production of one part). The graph shows that the average welding current has a decreasing trend over the entire lifespan of a contact tip, and that the average welding current values become increasingly more scattered (standard deviation of the average welding current values increases) as the contact tip is used. Thus, in a production environment, the deterioration of a contact tip can be determined by monitoring and analyzing welding parameters such as the average welding current, the voltage, and deviations (spread) of these parameters.

Figure 3:
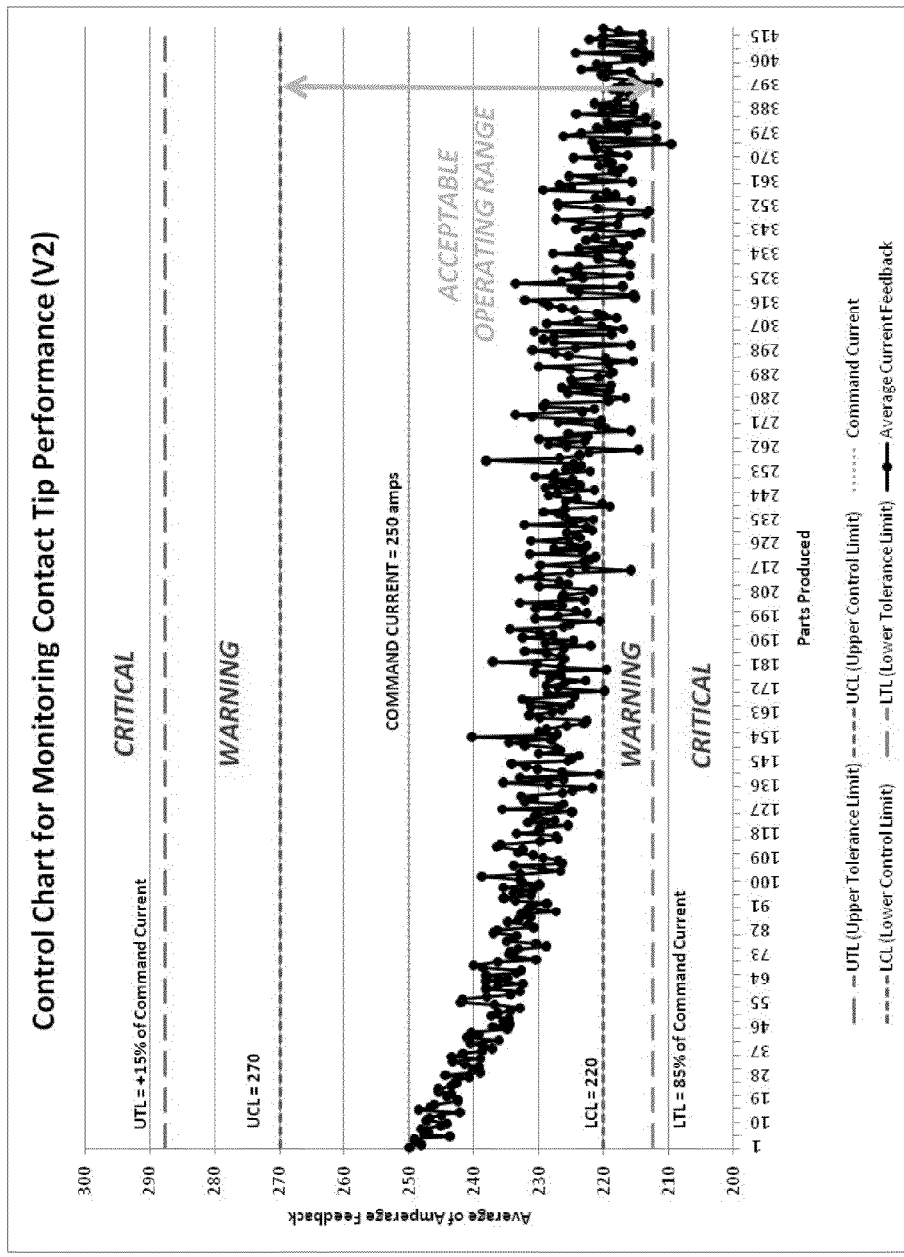
FIG. 3 is a control chart for monitoring contact tip performance in accordance with the present invention.

Turning to FIG. 3, in the presently claimed invention, the average welding current of the welding torch is measured and fed back to the controller. The controller displays a real time chart of the average welding current as a function of parts produced (production in terms of a part count) using the contact tip. The upper and lower control limits and the upper and lower tolerance limits may be calculated automatically or may be entered manually by the user. For example, the upper and lower control limits may be manually set at 270 and 220 Amps, respectively, while the upper and lower tolerance limits may be calculated automatically as ±15% of the command current. In this example, the command current (desired welding current) is set at 250 Amps. As discussed above, the key indicator (in this case the average welding current) degrades as a function of part production. The user may arrange the system so that a rule is established to issue a warning signal when the key indicator operates in a region (e.g., "warning region") that is beyond the upper or lower control limit. The user may also establish a rule that the contact tip should be removed if the key indicator operates in a region that is beyond the upper or lower tolerance limits (e.g., a "critical region").

As shown in FIG. 3, the command current may be 250 Amps. As the contact tip degrades with use, the actual average welding current at the contact tip decreases from 250 Amps as a function of parts produced. The welding operator may set the lower control limit at 220 Amps, thereby establishing the warning region as a welding current that is less than the lower control limit (220 Amps) and greater than the lower tolerance unit (in this case calculated as −15% of the command current, i.e. 212.5 Amps). The system outputs a warning signal such as an audible alarm, a visual alarm, or similar. In the example, a warning signal is first issued around the time of about 172 parts produced by the contact tip. The system also may be arranged to adjust certain welding parameters to compensate for the decrease in the average welding current when the measured average welding current falls into the warning region. In any event, an acceptable operating range of the welding torch is set between the upper and lower control limits, and the welding torch may continue to operate even if the average welding current is in the warning region. Further, a contact tip change may be scheduled for a certain time after the average welding current falls into the critical region, i.e., below the lower tolerance limit of 212.5 Amps. In the example, the average welding current first falls below the lower tolerance limit around the time of about 375 parts produced.

Figure 4:
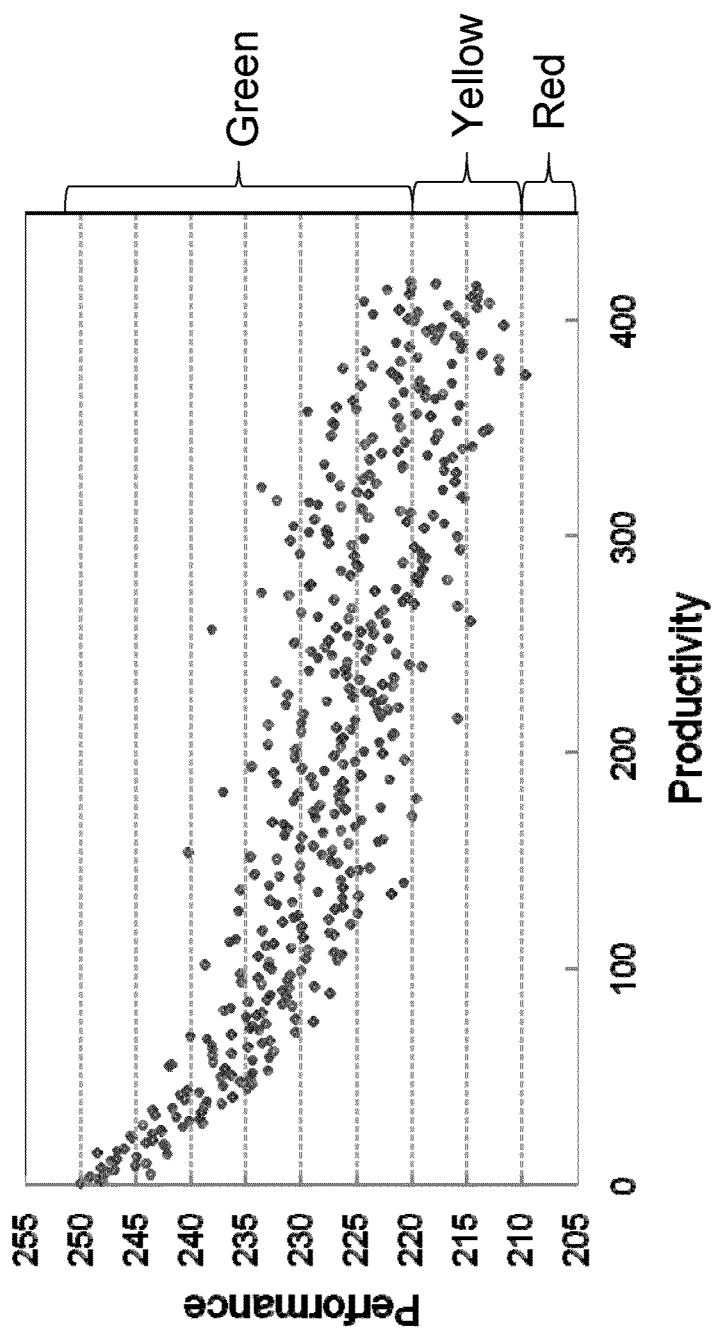
FIG. 4 is an alternative control chart for monitoring contact tip performance in accordance with the present invention.

An alternative example of a control chart in accordance with the present invention is shown in FIG. 4. Similar to the previous example, the y-axis represents contact tip performance in terms of average welding current, and the x-axis represents contact tip life in terms of productivity (i.e., number of parts produced using the contact tip). The lower control limit may be set at 220 Amps, and the lower tolerance limits may be set at 210 Amps. As the contact tip degrades through use, the average welding current measured by the system begins to fall into the warning region between the lower control limit and the lower tolerance limit, at which time a warning signal may be activated. The data is fed back to the operator in real time, and may be shown in green, yellow, and red colors (as shown schematically in the FIG. 4) to indicate that the data is in the acceptable operating range, the warning region, and the critical region, respectively. When the average welding current falls into the critical region below the lower tolerance limit, the welding operator may schedule a contact tip change.

Figure 5:
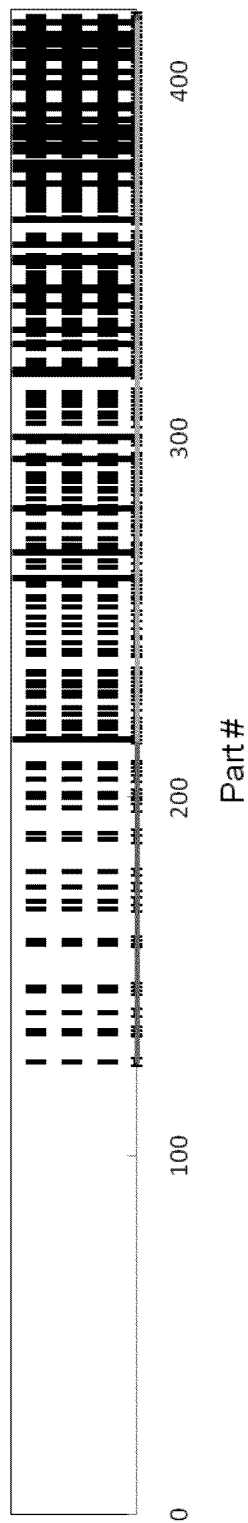
FIG. 5 is another alternative control chart for monitoring contact tip performance in accordance with the present invention.

Another alternative example of a control chart is shown in FIG. 5. This control chart is composed of a group of vertical short lines. Each vertical short line represents one part that is manufactured by the current contact tip. Instead of showing the absolute data of the average welding current, the range of the average welding current is represented by the color of this short vertical line. For example, if the average welding current is within the UCL and LCL for a certain part number, the color of the short vertical line may be green (schematically shown as a solid white vertical line in the black and white chart). If the average welding current is out of the LCL but within the LTL, the color of the short vertical line may be yellow (schematically shown as a dashed vertical line in the black and white chart). And if the average welding current is out of the LTL, the color of the short vertical line may be red (schematically shown as a solid black vertical line in the black and white chart). This simple visual information is fed back to the operator, enabling him/her to quickly monitor the status of the contact tip.

Figure 6:
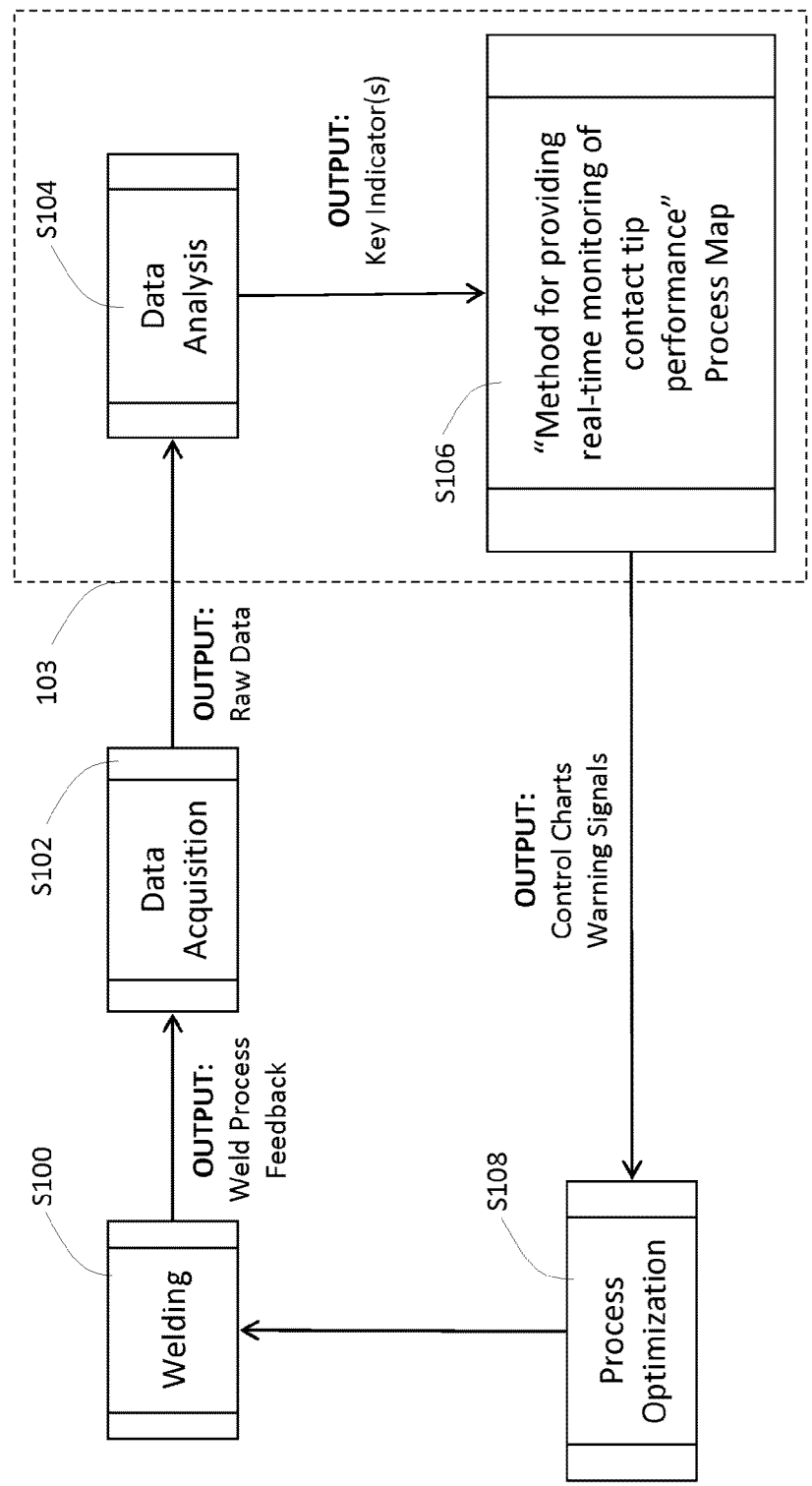
FIG. 6 is a flow chart including steps of a method of monitoring contact tip performance in accordance with the present invention.

FIG. 6 is a process flow chart illustrating the integration of the present real time monitoring of contact tip performance into a GMAW production welding cell. At S100, the welding torch performs a welding operation on a workpiece based on control signals sent from the welding controller. At S102, the welding controller or other associated electronics acquires in real time welding data from the welding process, such as but not limited to welding current and/or welding voltage data. The primary components of the system may be connected by either an Ethernet or wireless network. The data may be transferred over the network and stored in a relational database or server where it can be accessed by a network client. The dashed box 103 represents the data base or server. At S104, the software program, welding controller or other associated electronic device fetches data from the relational database via a network client that is connected to the Ethernet network. Further, the data is analyzed, and key indicator(s) are calculated such as but not limited to average welding current, average welding voltage, standard deviation of the welding current, and standard deviation of the welding voltage. At S106, the software, welding controller or other associated electronics outputs and displays a control chart such as that described above, and the contact tip performance is monitored by the welding controller and a welding operator in the manner described above. The results are fed back from the server 103 to the operation terminals through an Ethernet or wireless network. The results can also be accessed by other clients, such as the maintenance team, welding engineer, quality management team, etc. Also, the welding controller may signal warning alarms as described above. At S108, the control chart and the warning alarms may be used to optimize the welding process, such as by adjusting welding parameter(s) when a warning alarm is signaled, or by efficiently scheduling a welding tip change after the alarm is signaled.

While the method has been described in relation to the average welding current, the method may be similarly applied using the average welding voltage.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method for tracking welding contact tip deterioration in real time, the method including the steps of:
   establishing a reference that relates welding parameters during welding production to contact tip life;
   choosing a representative weld from among the welds that are performed on a single part;
   monitoring welding parameters of a contact tip during use only while performing the same representative weld on each successive part;
   comparing the monitored welding parameters to the reference;
   providing real-time feedback to an operator; and
   predicting contact tip failure from the comparison.

2. The method of claim 1, further including the step of:
   providing a warning when welding parameters deviate unacceptably from the reference.

3. The method of claim 1, further including the step of:
   scheduling a contact tip change when welding parameters deviate unacceptably from the reference.

4. The method of claim 1, wherein monitoring welding parameters of a contact tip during use includes:
   measuring one of welding current and welding voltage in real time.

5. The method of claim 1, wherein providing real-time feedback to an operator includes:
   displaying a control chart including average welding current plotted as a function of part count.

6. The method of claim 5, wherein the step of displaying a control chart further includes the steps of:
   forming four horizontal lines, the horizontal lines corresponding to a welding current value of an upper control limit, a welding current value of a lower control limit, a welding current value of an upper tolerance limit, and a welding current value of a lower tolerance limit;
   defining a warning region between the upper control limit and the upper tolerance limit, and between the lower control limit and the lower tolerance limit; and
   defining a critical region beyond the upper tolerance limit and beyond the lower tolerance limit.

7. The method of claim 6, wherein the upper tolerance limit is set at 115% of a command welding current and the lower tolerance limit is set at 85% of the command welding current.

8. The method of claim 6, wherein the upper and lower control limits are set manually.

9. The method of claim 6, further including the step of:
   issuing a warning signal if the monitored welding parameters fall into the warning region.

10. The method of claim 6, further including the step of:
    replacing the contact tip if the monitored welding parameters fall into the critical region.

11. The method of claim 5, wherein the step of displaying a control chart further includes the steps of:
    setting a lower control limit at a welding current value that is less than a command welding current value, and setting a lower tolerance limit at a welding current value that is less than the lower control limit;
    defining a warning region between the lower control limit and the lower tolerance limit;
    defining a critical region that is below the lower tolerance limit;

displaying the values of the average welding current that are outside the warning region and critical region in a green color, displaying the values of the average welding current that are in the warning region in a yellow color, and displaying the values of the average welding current that are in the critical region in a red color.

12. The method of claim 5, wherein the step of displaying a control chart further includes the steps of:
forming a solid white vertical line for an average welding current value that is within upper and lower control limits;
forming a dashed black-and-white vertical line for an average welding current value that is out of the lower control limit but within a lower tolerance limit; and
forming a solid black vertical line for an average welding current value that is below the lower tolerance limit.

* * * * *